United States Patent [19]

Ezekoye

[11] Patent Number: 4,573,344
[45] Date of Patent: Mar. 4, 1986

[54] VALVE PACKING LEAKAGE MONITORING DEVICE

[75] Inventor: Levi I. Ezekoye, Wilkinsburg, Pa.

[73] Assignee: Westinghouse Electric Corp., Pittsburgh, Pa.

[21] Appl. No.: 622,295

[22] Filed: Jun. 19, 1984

[51] Int. Cl.⁴ ............................................. G01M 3/28
[52] U.S. Cl. ..................................... 73/46; 73/40.5 R
[58] Field of Search ...................... 73/46, 49.8, 40.5 R, 73/40

[56] References Cited

U.S. PATENT DOCUMENTS

| | | | |
|---|---|---|---|
| 3,276,246 | 10/1966 | Truman et al. | 73/40.5 R |
| 3,344,807 | 10/1967 | Lehrer et al. | 73/46 X |
| 3,768,305 | 10/1973 | Pechko et al. | 73/46 X |
| 3,969,923 | 7/1976 | Howell | 73/40.5 R |

*Primary Examiner*—Stewart J. Levy
*Assistant Examiner*—Joseph W. Roskos
*Attorney, Agent, or Firm*—Daniel C. Abeles

[57] ABSTRACT

A device for monitoring leakage of fluid across a seal in a component connected to a pressurized fluid system. The device includes a housing defining a chamber which includes an inlet for receiving fluid leaking across the seal and an outlet. A plate having an orifice is disposed in the chamber transverse to the longitudinal axis of the chamber and between the inlet and outlet for dividing the chamber into a first chamber volume for receiving fluid through the inlet and a second chamber volume for receiving fluid through the orifice and for discharging the fluid through the outlet. A plug is movably mounted for adjusting the open area in the plane of the orifice in the plate. A positioning arrangement is connected to the plug for positioning the plug to create a predetermined open area in the plane of the orifice for permitting the fluid to exit the first chamber volume through the orifice at the same rate at which it enters the first chamber volume when the rate of fluid entering the first chamber volume is at or below a given rate. The positioning arrangement is further responsive to fluid entering the first chamber volume at a rate greater than the given rate for moving the plug away from the orifice so that the fluid exiting the first chamber volume will continue to equal the rate at which the fluid enters the first chamber volume. A device for detecting the movement of the plug produces an output signal corresponding to the distance moved by the plug.

10 Claims, 1 Drawing Figure

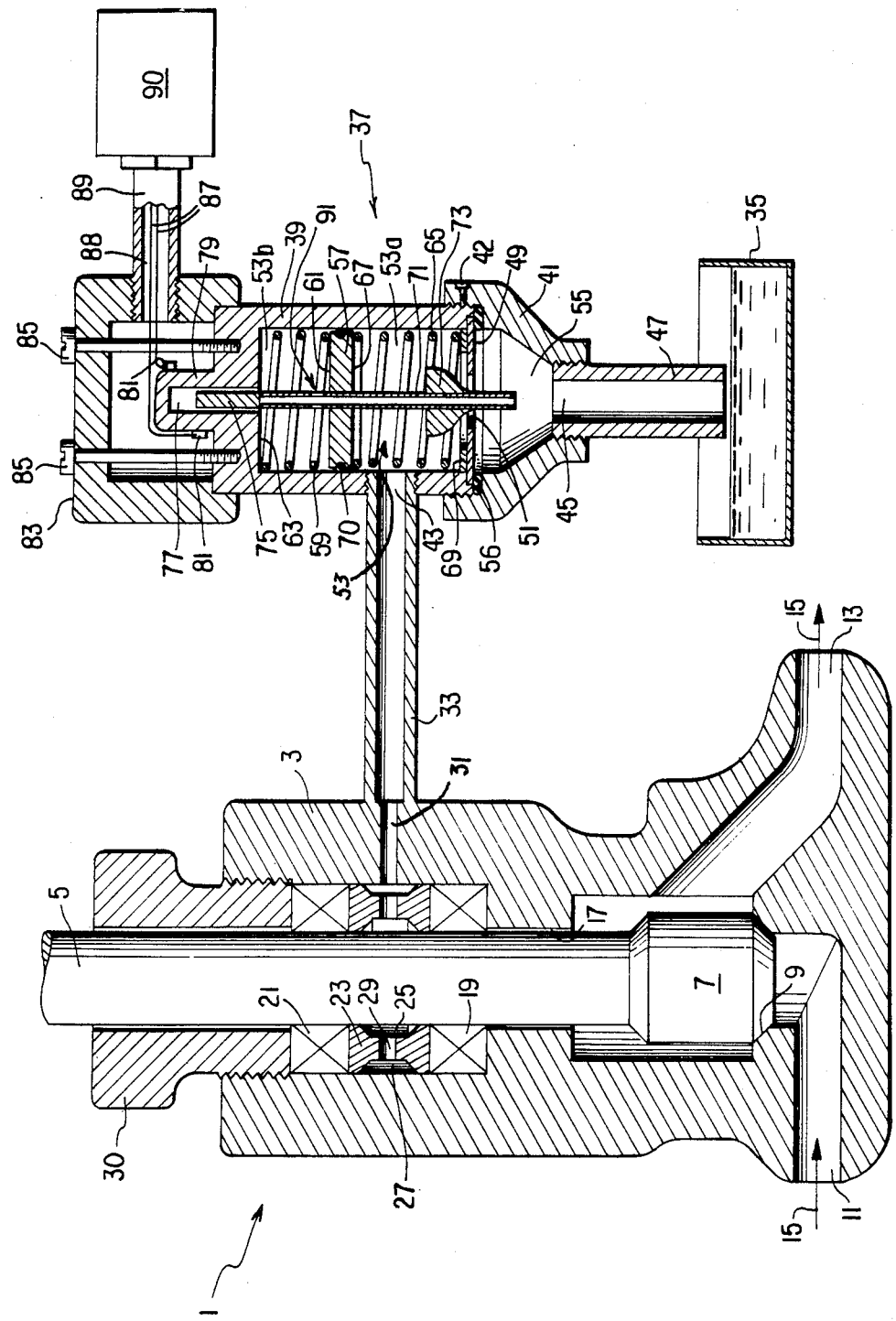

VALVE PACKING LEAKAGE MONITORING DEVICE

BACKGROUND OF THE INVENTION

1. Field of the Invention

The invention concerns a device for monitoring the leakage of fluid from a component subjected to a pressurized fluid, and more particularly to a device for monitoring fluid leakage through a valve stem seal of a valve connected for controlling the flow of fluid in a pressurized fluid system.

2. Description of the Prior Art

In a pressurized water system, such as a pressurized water nuclear reactor, it is known to provide valves for controlling the flow of water in the system with leak-off connections between the primary and secondary valve stem packings. Water which leaks through the primary valve stem packing collects in a reservoir located between the primary and secondary packings of the valve stem and is drained off into a sump. Such drainage prevents a buildup of fluid pressure between the packings which could damage the secondary packing and result in leakage therethrough. In a pressurized water nuclear reactor this is particularly important in order to prevent radioactively contaminated water from escaping from an otherwise closed fluid system.

In a pressurized water system containing many valves, each having a leak-off connection, it is possible to determine the gross leakage of the system by measuring the amount of water flowing into the sump. An excessive flow into the sump could indicate that the primary packing on one of the valves is severely deteriorated. However, in such a system it is not possible to remotely assess the condition of any one valve. It is necessary to manually check each valve to determine which one is faulty. In a pressurized water reactor system, manual checking can be dangerous, because if the leakage through the primary packing becomes too great, the capacity of the reservoir between the packings could be exceeded. The resulting pressure against the secondary packing could cause contaminated water to leak through the secondary packing posing obvious health hazards.

It would therefore be desirable to be able to remotely assess the condition of each valve in the system on a continuing basis in order to prevent excessive leakage through the respective primary packings.

U.S. Pat. No. 3,276,246, issued to Truman et al, discloses a leakage detector for an oil wellhead wherein a vessel containing a float switch is disposed to collect oil leaking out of the top of the wellhead and accumulating between upper and lower packing glands. The float has a specific gravity lower than that of oil. As the level of the oil collecting in the vessel rises the float also rises. At a certain level the float activates a proximity switch which shuts down the wellhead motor. The vessel is provided with a weep hole for draining minor accumulations of oil and/or lubricant and a drain plug which can be manually removed to drain the vessel when significant amounts of oil are collected in the vessel. A problem with this device is that an excessive oil leak may cause the upper packing gland to fail if for some reason the float gets stuck or the motor fails to turn off in time before the vessel becomes completely filled with oil causing a back pressure against the upper packing gland.

SUMMARY OF THE INVENTION

It is an object of the invention to provide a device for monitoring the leakage of fluid through a seal or packing of a component subjected to a pressurized fluid while at the same time permitting the leaked fluid to drain off without building up a back pressure within the component.

It is a further object of the invention to provide a device for monitoring the leakage of fluid through the primary packing of a valve stem in a valve connected to a pressurized fluid system while permitting the leaked fluid to drain off without creating an excessive back pressure against the secondary packing of the valve stem.

It is another object of the invention to provide a method for scheduling maintenance for the packings of the valve stem in a valve provided with a leak-off connection with the use of a device for monitoring leakage according to the invention.

The above and other objects are accomplished according to the invention by the provision of a device for detecting leakage of fluid across a seal in a component connected to a pressurized fluid system. The device includes a housing defining a chamber having a longitudinal axis. The housing includes an inlet for receiving fluid leaking across the seal of the component and an outlet. A plate having an orifice is disposed in the chamber transverse to the longitudinal axis and between the inlet and the outlet. The plate divides the chamber into a first chamber volume for receiving fluid through the inlet, and a second chamber volume for receiving fluid through the orifice and for discharging fluid collected therein through the outlet. A plug is movably mounted for adjusting the open area in the plane of the orifice of the plate. A positioning means is connected to the plug for positioning the plug to create a predetermined open area in the plane of the orifice for permitting the fluid to exit the first chamber volume through the orifice at the same rate at which it enters the first chamber volume through the inlet when the rate of fluid entering the first chamber volume is at or below a given rate. The positioning means is further responsive to fluid entering the first chamber volume at a rate greater than the given rate for moving the plug away from the orifice so that the fluid exiting the first chamber volume will continue to equal the rate at which the fluid enters the first chamber volume. A detecting means is provided for detecting the movement of the plug and producing an output signal corresponding to the distance moved by the plug and hence to the rate of leakage through the seal.

In a preferred embodiment of the invention the above-described leakage monitoring device is employed in combination with a valve for controlling the flow of fluid in a pressurized fluid system, wherein the valve includes a valve body and a valve stem axially movable within the valve body and having one end subjected to the system pressure. Primary and secondary valve packings are axially spaced apart along the valve stem for providing a seal to minimize fluid leakage between the valve body and the valve stem. The primary packing is disposed between the one end of the valve stem subjected to the system pressure and the secondary packing. A leak-off connection connects a reservoir provided between the primary and secondary packings with the inlet of the leakage monitoring device.

The invention further provides for an advantageous method of providing maintenance to the seal of a component subjected to a pressurized fluid with the use of a fluid leakage monitoring device as described above. The method includes connecting the inlet of the device for receiving fluid which leaks across the seal, connecting the outlet of the device to a sump, feeding the output of the detecting means to an indicator to provide an indication of the amount of leakage fluid passing through the device to the sump, and repairing the seal when the amount of leakage fluid passing through the device exceeds a predetermined level.

BRIEF DESCRIPTION OF THE DRAWINGS

The sole FIGURE in the drawings shows a cross-sectional side view of an arrangement according to the invention.

DESCRIPTION OF THE PREFERRED EMBODIMENT

As shown in the FIGURE a valve 1, only part of which is illustrated, includes a valve body 3 having a valve stem 5 axially movable therethrough. Valve stem 5 has a valve plug 7 which controllably engages a valve seat 9 for controlling the flow of system fluid from the valve inlet 11 to the valve outlet 13. Thus, when valve plug 7 is withdrawn from valve seat 9 the fluid flows in the direction of arrows 15. As may be appreciated, when the valve is open the interface 17 of valve stem 5 with body 3 is subjected to the system pressure. In order to prevent leakage of system fluid out of the valve between valve stem 5 and valve body 3 a double seal arrangement is provided including a primary packing 19 and a secondary packing 21 with a lantern ring 23 disposed therebetween. Lantern ring 23 includes inner and outer annular grooves 25 and 27, respectively, connected by a bore 29. Grooves 25 and 27 and bore 29 serve as a reservoir for collecting system fluid which will, as is inherent with any mechanical seal, leak through primary packing 19. A packing flange 30, which may be threadably engaged with valve body 3, presses against secondary packing 21 to hold the seal arrangement in place.

A bore 31 through valve body 3 opens into outer groove 27 for draining fluid collected within the spaces of the lantern ring 23 through a leak-off connection 33 which in a conventional arrangement leads directly to a sump 35 for receiving the fluid leakage. By continuously draining the fluid leaking through primary packing 19 the fluid pressure against secondary packing 21 is minimized with the result that secondary packing 21 presents an effective barrier against further leakage up between the valve stem 5 and valve body 3.

In operation, valve stem 5 will be subjected to several thousand cycles of up and down movement which inevitably results in a deterioration of the packings. If the leakage through primary packing 19 becomes excessive it is possible that the leakage fluid will not drain off quickly enough and that a back pressure could develop which could cause leakage through secondary packing 21.

The risk of leakage through secondary packing 21 is reduced according to the invention by the provision of a device 37 which monitors the rate at which leakage fluid is drained off through leakage connection 33. As shown in the FIGURE, device 37 comprises a housing having a main body 39 threadably engaged with an end piece 41. A set screw 42 is preferably employed to secure body 39 and end piece 41 against rotation while in use. Body 39 has an inlet opening 43 which is connected to leak-off connection 33. End piece 41 has an outlet opening 45 which is connected to a pipe 47 leading to sump 35.

The two piece housing comprised of body 39 and end piece 41 encloses a chamber which is divided by a plate 49 having a central orifice 51 into an upper chamber volume 53 and a lower chamber volume 55. A gasket 56 is positioned beneath plate 49 and between body 39 and end-piece 41 to prevent leakage to the atmosphere and to prevent leakage from upper chamber volume 53 into lower chamber volume 55 other than through orifice 51 as will be explained.

A floating piston 57 is contained within upper chamber volume 53 and is held in a dynamic equilibrium by an upper compression spring 59 which is supported by the upper surface 61 of piston 57 and the end surface 63 of body 39, and a lower compression spring 65 which is supported by a lower surface 67 of piston 57 and a circular shim ring 69 which rests on orifice plate 49. Piston 57 thus divides upper chamber volume 53 into a partial volume 53a between piston 57 and orifice plate 49 and a partial volume 53b between piston 57 and end surface 63 of body 39. A piston seal 70 is disposed between piston 57 and the inner surface of body 39 to prevent leakage therebetween from partial volume 53a into partial volume 53b.

A hollow tube 71 passes through and is rigidly connected with piston 57. Hollow tube 71 extends downwardly just past orifice 51 and has a shaped plug 73 fastened to it just above orifice 51 for adjusting the open area in the plane of orifice 51 as will be described below. At the opposite end of hollow tube 71 a magnetic end portion 75 is provided for movement in and out of a slot 77 enclosed by a hat portion 79 at the upper end of body 39. A plurality of proximity switches 81, two of which are shown in the FIGURE, are axially spaced from one another along the outside of hat portion 79 for sequential activation by magnetic end portion 75. A switch cover 83 is attached by screws 85 to the upper end of body 39 for enclosing and protecting switches 81. Switches 81 have lead wires 87 which pass through an opening 88 in switch cover 83 and an electrical conduit 89 for connection to a display device 90.

In operation, when valve stem leakage occurs through primary packing 19, the leaking fluid accumulates in the spaces of lantern ring 23 and is transmitted by leakoff connection 33 through inlet opening 43 into partial chamber volume 53a of device 37. As mentioned above due to the mechanical nature of the seal provided by primary packing 19, a small or nominal amount of leakage is always expected to occur. Accordingly, by appropriate selection of springs 59 and 65 and shim ring 69, plug 73 is initially positioned relative to orifice 51 so that the opening in the plane of orifice 51 permits the flow of liquid from partial chamber volume 53a into lower chamber volume 55 to equal the nominal in-flow of leaking fluid into partial volume 53a. As long as the rate of fluid entering partial chamber volume 53a is equal to the rate of fluid flowing out of this volume through orifice 51, the position of piston 57, rod 71 and plug 73 remains the same. If, however, the rate of fluid flowing into partial chamber volume 53a exceeds the rate at which the fluid exits this partial volume, then partial chamber volume 53a fills up with fluid and pushes floating piston 57 upward. The upward movement of piston 57 simultaneously causes an upward movement of plug 73 which expands the area of the opening in the plane of orifice 51. The rate at which the open area in the plane of orifice 51 expands can be adjusted by appropriately shaping the surface of plug 73 which is adjacent orifice 51.

As primary packing 19 further deteriorates with use the rate of leakage into device 37 will increase pushing piston 57 further up within chamber volume 53. Magnetic end portion 75 which moves with piston 57 will eventually reach the first proximity switch 81, causing it to close. Current flowing through the closed proximity switch is fed to display device 90 which activates a display to indicate that the leakage through the primary packing of the valve stem has reached a predetermined rate. A further increase in the leakage will move magnetic end portion 75 into the range of the next sequential proximity switch which is activated to indicate that a still higher rate of leakage has been attained. Because the proximity switches are placed at sequential lift positions, the leakage rates can be closely monitored by observing the display device 90 which indicates the sequential activation of the proximity switches. Display device 90 can be of any suitable design to indicate the individual status of switches 81.

Since the leakage rates correspond to the deterioration of the primary packing 19, a service schedule for repairing or repacking the valve stem packings 19 and 21 can be implemented by using the device in accordance with the invention.

Hollow tube 71 is provided with radial bleed holes 91 so that in the event that piston seals 70 break-down, any leakage into partial chamber volume 53b is piped out through the radial bleed holes 91 down hollow tube 71 for discharge to the sump via outlet opening 45 and pipe 47. Thus, partial chamber volume 53b is prevented from being filled with fluid which could otherwise render the device inoperative.

The device in accordance with the invention operates to monitor the rate of leakage through the valve stem primary packing while at the same time permitting the fluid leakage to pass out of the device at the same rate at which it enters the device so that no significant pressure build-up will occur in the partial chamber volume 53a which could cause failure of the valve stem secondary packing 21.

Since the device according to the invention indicates the status of valve leakage it can be used to provide guidance as to when to schedule maintenance of the valve stem packings.

The display 90 can be provided locally with the device 37 or can be provided remotely and connected with a plurality of devices 37 for monitoring the leakage rates of a respective plurality of valves.

It should be appreciated that it is within the scope of the invention that other positioning mechanisms, such as a bellows-like device or a displaceable diaphragm arrangement, can be used in lieu of the disclosed piston arrangement for positioning plug 73.

It will be understood that the above description of the present invention is susceptible to various modifications, changes and adaptations, and the same are intended to be comprehended within the meaning and range of equivalence of the appended claims.

I claim:

1. A device for detecting leakage of fluid across a seal in a component connected to a pressurized fluid system, comprising:

a housing defining a chamber having a longitudinal axis, said housing including an inlet for receiving fluid leaking across the seal and an outlet;

a plate having an orifice disposed in said chamber transverse to said longitudinal axis and between said inlet and said outlet for dividing said chamber into a first chamber volume for receiving fluid through said inlet and a second chamber volume for receiving fluid from said first chamber volume through said orifice and for discharging the fluid through said outlet;

a plug movably mounted for adjusting the open area in the plane of the orifice in said plate;

positioning means connected to said plug for positioning said plug to create a predetermined open area in the plane of the orifice for permitting the fluid to exit said first chamber volume through the orifice at the same rate at which it enters said first chamber volume when the rate of fluid entering said first chamber volume is at or below a given rate, said positioning means being responsive to fluid entering said first chamber volume at a rate greater than the given rate for moving the plug away from the orifice so that the fluid exiting said first chamber volume will continue to equal the rate at which the fluid enters said first chamber volume; and detecting means for detecting the movement of said plug, said detecting means producing an output signal corresponding to the distance moved by said plug.

2. A device according to claim 1, wherein said positioning means includes a piston disposed in said first chamber volume for movement in the direction of the longitudinal axis of said chamber, a rod connecting said piston to said plug, and a spring means for biasing said piston to a predetermined position when the rate of the fluid entering said first chamber volume is at or below the given rate, the predetermined position of said piston corresponding to the position of said plug which creates the predetermined open area in the plane of said orifice, wherein said piston is caused to move in response to a build-up of fluid pressure in said first chamber volume.

3. A device according to claim 2, wherein said housing has an end on the side of said piston remote from said plate and said spring means includes a first compression spring mounted between said plate and said piston and a second compression spring mounted between said piston and said end of said housing.

4. A device according to claim 1, wherein said detecting means includes a proximity switch which is activated by said positioning means.

5. An arrangement comprising a device according to claim 1 in combination with a valve for controlling the flow of fluid in a pressurized fluid system, said valve comprising: a valve body; a valve stem axially movable within said valve body and having one end subjected to system pressure; primary and secondary valve packings axially spaced apart along said valve stem for providing a seal to minimize fluid leakage between said valve body and said valve stem, said primary packing being disposed between said one end of said valve stem and said secondary packing; means defining a reservoir between said primary and secondary packings; and a leak-off connection for connecting said reservoir with the inlet of said device.

6. A method of providing maintenance to the seal of a component using a device according to claim 1, comprising:

connecting the inlet of the device for receiving fluid which leaks across the seal;

connecting the outlet of the device to a sump, feeding the output of the detecting means to an indicator to provide an indication of the amount of leakage fluid passing through the device to the sump; and repairing the seal when the amount of leakage fluid passing through the device exceeds a predetermined level.

7. A device responsive to leakage of fluid across a seal in a component connected to a pressurized fluid system, comprising:

a housing defining a chamber having a longitudinal axis, said housing including an inlet for receiving fluid leaking across the seal and an outlet;

a plate having an orifice disposed in said chamber transverse to said longitudinal axis and between said inlet and said outlet for dividing said chamber into a first chamber volume for receiving fluid through said inlet and a second chamber volume for receiving fluid from said first chamber volume through said orifice and for discharging the fluid through said outlet;

a plug movably mounted for adjusting the open area in the plane of the orifice in said plate; and positioning means connected to said plug for positioning said plug to create a predetermined open area in the plane of the orifice for permitting the fluid to exit said first chamber volume through the orifice at the same rate at which it enters said first chamber volume when the rate of fluid entering said first chamber volume is at or below a given rate, said positioning means being responsive to fluid entering said first chamber volume at a rate greater than the given rate for moving the plug away from the orifice so that the fluid exiting said first chamber volume will continue to equal the rate at which the fluid enters said first chamber volume.

8. A device according to claim 7, wherein said positioning means includes a piston disposed in said first chamber volume for movement in the direction of the longitudinal axis of said chamber, a rod connecting said piston to said plug, and a spring means for biasing said piston to a predetermined position when the rate of the fluid entering said first chamber volume is at or below the given rate, the predetermined position of said piston corresponding to the position of said plug which creates the predetermined open area in the plane of said orifice, wherein said piston is caused to move in response to a build-up of fluid pressure in said first chamber volume.

9. A device according to claim 8, wherein said housing has an end on the side of said piston remote from said plate and said spring means includes a first compression spring mounted between said plate and said piston and a second compression spring mounted between said piston and said end of said housing.

10. An arrangement comprising a device according to claim 8 in combination with a valve for controlling the flow of fluid in a pressurized fluid system, said valve comprising: a valve body; a valve stem axially movable within said valve body and having one end subjected to system pressure; primary and secondary valve packings axially spaced apart along said valve stem for providing a seal to minimize fluid leakage between said valve body and said valve stem, said primary packing being disposed between said one end of said valve stem and said secondary packing; means defining a reservoir between said primary and secondary packings; and a leak-off connection for connecting said reservoir with the inlet of said device.

* * * * *